United States Patent
Scouller et al.

(10) Patent No.: US 8,250,319 B2
(45) Date of Patent: Aug. 21, 2012

(54) OPERATING AN EMULATED ELECTRICALLY ERASABLE (EEE) MEMORY

(75) Inventors: Ross S. Scouller, Austin, TX (US); Daniel L. Andre, Austin, TX (US); Stephen F. McGinty, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 357 days.

(21) Appl. No.: 12/569,025

(22) Filed: Sep. 29, 2009

(65) Prior Publication Data

US 2011/0078362 A1    Mar. 31, 2011

(51) Int. Cl.
    G06F 12/12    (2006.01)
(52) U.S. Cl. ......... 711/155; 711/101; 711/103; 711/165
(58) Field of Classification Search .................. None
    See application file for complete search history.

(56) References Cited

U.S. PATENT DOCUMENTS

| 6,275,436 | B1 | 8/2001 | Tobita et al. |
| 6,904,400 | B1 | 6/2005 | Peri et al. |
| 7,058,755 | B2 | 6/2006 | Nallapa |
| 7,406,558 | B2 | 7/2008 | Przybylek |
| 7,433,993 | B2 | 10/2008 | Sinclair |
| 2004/0044849 | A1 | 3/2004 | Stence et al. |
| 2009/0193184 | A1 | 7/2009 | Yu et al. |
| 2010/0250875 | A1* | 9/2010 | Leung et al. .................. 711/155 |

* cited by examiner

*Primary Examiner* — Than Nguyen (74) *Attorney, Agent, or Firm* — James L. Clingan; Joanna G. Chiu (57) ABSTRACT

An emulated electrically erasable memory system includes a random access memory (RAM) and a non-volatile memory (NVM). A write access to the RAM is received which provides first write data and a first address, where the first write data is stored in the RAM at the first address, and a currently filling sector of the NVM is updated to store both the first write data and the first address as a first record. In response to the write access, based on whether there are any remaining active records in an oldest filled sector of the NVM, a portion of an erase process or a transfer of up to a predetermined number of active records from the oldest filled sector to the currently filling sector is performed. The predetermined number of active records is less than a maximum number of total records that may be stored within the oldest filled sector.

18 Claims, 4 Drawing Sheets

OPERATING AN EMULATED ELECTRICALLY ERASABLE (EEE) MEMORY

BACKGROUND

1. Field

This disclosure relates generally to memory systems, and more specifically, to method of operating an emulated electrically erasable (EEE) memory.

2. Related Art

Emulated electrically erasable (EEE) memories typically use a random access memory and a non-volatile memory that is electrically erasable combined to provide a memory system that has increased endurance over a regular non-volatile memory for a comparable size to that of the random access memory. This is achieved using a non-volatile memory much larger than the random access memory but EEE memory operates as if it were only the size of the random access memory. Thus the EEE memory emulates an electrically erasable memory of a reduced size from that which is used by the EEE memory but with an increase in endurance. This is useful in situations in which endurance is very important such as automotive applications in which data is updated often and must be stored in a non-volatile manner.

One problem common to EEE memories is that there can occasionally be long delays in being able to write data into the non-volatile memory because the too many locations in a sector in the non-volatile memory have data that is divided between valid data and invalid data. So before those locations can be written again, the sector must be erased but before the erase operation the locations with valid data must be written elsewhere. When this occurs there may an excessive amount of time required to perform all the necessary operations to perform the write operation.

Accordingly, there is a need to provide an EEE memory that improves upon the issue described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect an emulated electrically erasable (EEE) memory has a RAM and an NVM divided into sectors. In response to an update, which includes a write of a record in the NVM, of the EEE memory, a small subset of the records of the sector of the NVM that was oldest filled are transferred to the sector currently being filled. The small subset includes only active records. After all active records of the oldest-filled sector have been transferred, a portion of the erase process is performed in response to an update of the EEE memory. The erase process can be conveniently divided into a number of relatively short pulses so that the portion of the erase process performed in response to the update is simply to provide a single, or at least a reduced number, of write pulses to the oldest-filled sector. This approach is useful in avoiding a situation in which a long process of transferring all of the active records followed by the complete erase process must be performed in order to obtain needed space for providing a new write. This is better understood by reference to the drawings and the following specification.

In one embodiment, a flash memory is used as the NVM. In one example, and as used herein, programming refers to storing a logic level zero to a bitcell and erasing refers to storing a logic level one to a bitcell. However, in alternate embodiments, programming may refer to storing a logic level one to a bitcell and erasing may refer to storing a logic level zero to a bitcell. A logic level zero may also be referred to as a logic low and a logic level one may also be referred to as a logic high.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

The symbol "$" preceding a number indicates that the number is represented in its hexadecimal or base sixteen form. The symbol "%" preceding a number indicates that the number is represented in its binary or base two form. Note that in FIG. 2, the value of "FFFF" is in hexadecimal form and corresponds to "1111111111111111" in binary form.

Figure 1:
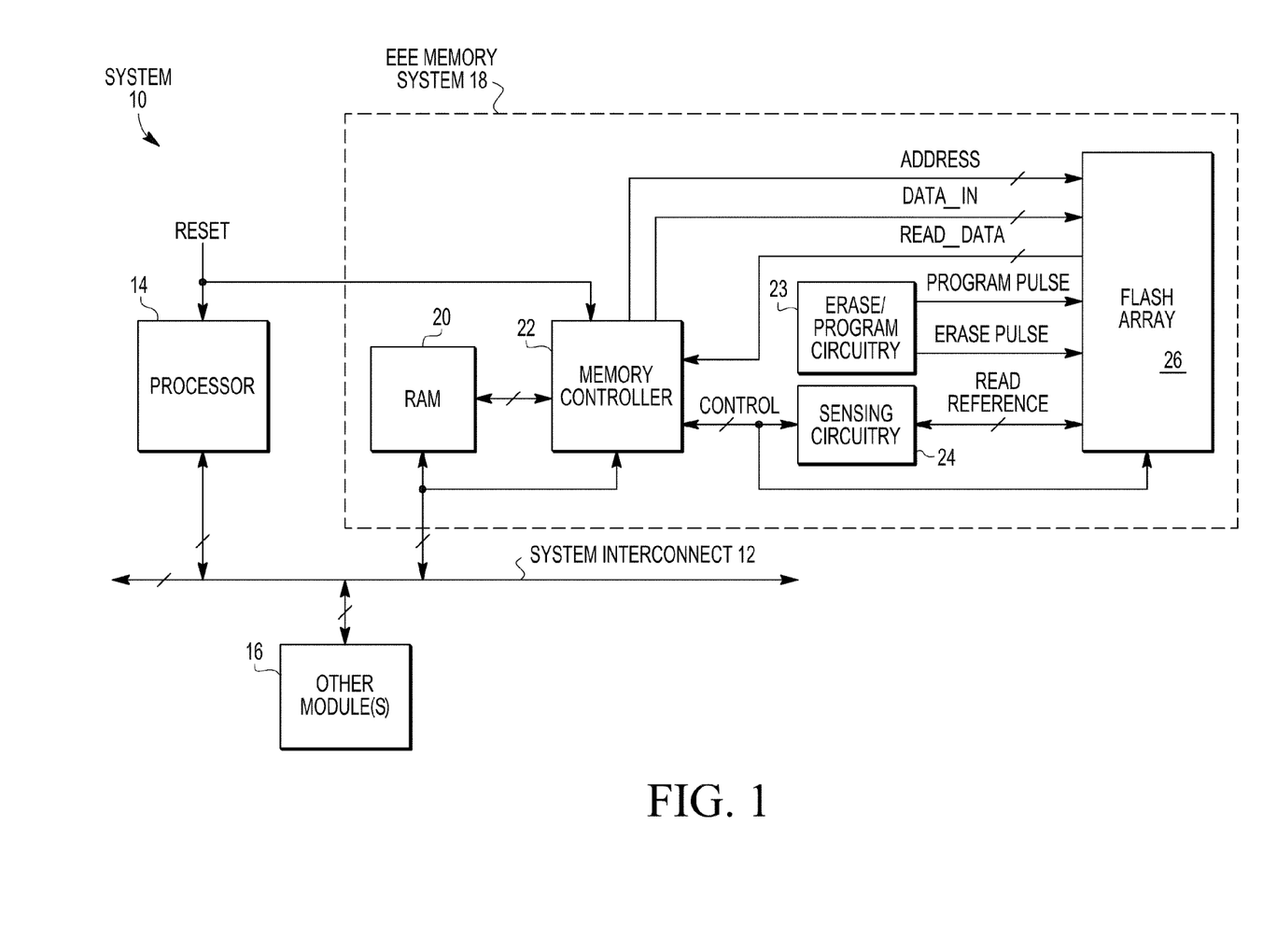
FIG. 1 illustrates in block diagram form a system, including an emulated electrically erasable memory using a non-volatile memory, useful in implementing an embodiment of the present invention.

FIG. 1 illustrates, in block diagram form, a system 10 which includes a processor 14, other module(s) 16 (if any), a system interconnect 12, and an EEE memory system 18 (which may also be referred to as a memory system or a non-volatile memory system). Each of processor 14, other module(s) 16, and EEE memory system 18 are bidirectionally coupled to system interconnect 12. EEE memory system 18 includes a RAM 20, a memory controller 22, erase/program circuitry 23, sensing circuitry 24, and a flash array 26 (which may also be referred to as an NVM array, where any type of NVM may be used in place of the flash memory). RAM 20 is bidirectionally coupled to system interconnect 12 and to memory controller 22. Memory controller 22 is coupled to sensing circuitry 24 and flash array 26. Erase/program circuitry 23 and sensing circuitry 24 are coupled to flash array 26. Memory controller 22 communicates control signals with sensing circuitry 24. Memory controller communicates control signals with flash array 26, provides an address and data_in to flash array 26 and receives read_data from flash array 26. Sensing circuitry 24 is capable of providing a normal read reference, a brownout read 0 reference, and a brownout read 1 reference to flash array 26. In one embodiment, only one of these references (which may be in the form of a reference voltage and/or reference current) is provided at a time to flash array 26. A reset signal is provided to processor 14 and memory controller 22. This reset signal may be, for example, a global reset signal for system 10.

Processor 14 can be any type of processor, such as a microprocessor, digital signal processor, etc., or may be any other type of interconnect master which can access EEE memory system 18. In one form, system interconnect 12 is a system bus. Other forms of interconnect may be used including, for example, crossbars, point-to-point connections, and optical and wireless transmission techniques. Other modules 16 may include any type of module, such as, for example, another memory, another processor, another interconnect master, a peripheral, an input/output (I/O) device, etc. Alternatively, no other modules may be present in system 10.

In operation, processor 14 can send access requests (read or write access requests) to memory system 18. The access requests from processor 14, which include an access address, and, in the case of a write access, associated write data, are provided to RAM 20. In the case of a read access, RAM 20 provides processor 14 the data stored at the received access address location. In the case of a write access, RAM 20 stores the received write data at the received access address location. In the case of a write access, memory controller 22 may detect an update of RAM 20 and selectively store the received access address and associated write data to flash array 26 in a logically sequential manner. For example, in the case of an update (a write) to RAM 20, the received access address and associated write data are used to form a record that is written to flash array 26 at the next available location. This next available location is logically sequential to a location that was loaded during an immediately preceding loading of flash array 26. (Note that, referring to FIG. 1, the received access address can be provided as address to flash array 26 and the associated write data as data_in to flash array 26.) In one example, the writing of the record corresponding to the RAM update is only performed if the value that is currently stored at the RAM location is different from the new write value associated with the write access request for that RAM location. In this manner, flash array 26 can store the values of RAM 20 which have been updated in a more permanent manner. That is, when RAM 20 loses power, its data is lost. Upon restoring power, the values of the RAM may be restored from flash array 26, which does not lose its data upon losing power. In one embodiment, flash array 26 has a greater storage capacity than RAM 20. For example, flash array 26 may have a capacity of at least four times greater than RAM 20 and typically much larger than that.

Figure 2:
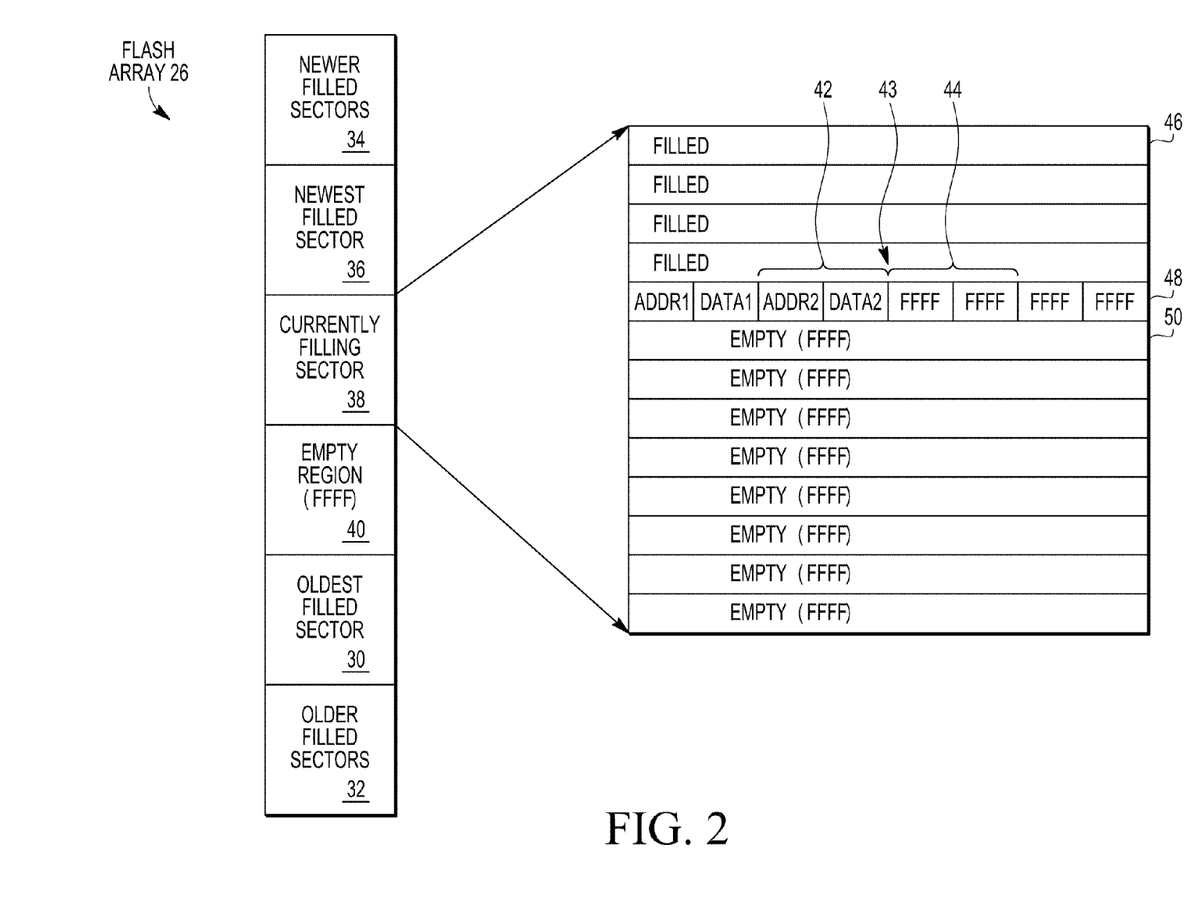
FIG. 2 illustrates, in block diagram form, a flash array of FIG. 1 in accordance with an embodiment of the present invention.

Operation of EEE memory system 18 will be described in further detail with respect to FIG. 2. FIG. 2 illustrates, in block diagram form, an embodiment of flash array 26 during operation of EEE memory system 18. Initially, all of flash array 26 is empty. In one embodiment, when a location of flash array 26 is empty, it has not yet been written with any value thus is in its erased state. In the embodiments described herein, the erased state corresponds to a logic level one; therefore, each empty or erased location of flash array 26 stores a logic level one. Flash array 26 includes N sectors. In one embodiment, data may be written to any location within these sectors by erase/program circuitry 23; however, when an erase is desired, each sector can only be erased as a block (on a sector by sector basis, where an erase of a sector by erase/program circuitry 23 may simultaneously erase all the contents of that sector). Note that when, in FIG. 2, a particular sector, region, or line is referred to as empty, "FFFF" is provided in parenthesis which represents that the bits in that empty sector, region, or line are logic level ones. This is also the erased condition.

As described above, each location of flash array 26 is updated in a sequential order, starting with a first location. Upon a next, immediately subsequent, update of RAM 20 (where the new write value is different from the value currently stored at the RAM location to be updated), a next location, adjacent and logically sequential to the first location, is written with a new record (and thus becomes the previous location for an immediately subsequent update). Therefore, upon an immediately subsequent update of RAM 20 (where the new write value is different from the value currently stored at the RAM location to be updated), a next location, adjacent and logically sequential to the previous location, is written with a new record. Thus, with each update of RAM 20 that is to be reflected in flash array 26, flash array 26 is loaded with a new record in a sequential manner. In the illustrated embodiment, flash array 26 includes an empty region 40 (which may include one or more empty sectors), an oldest filled sector 30, older filled sectors 32, newer filled sectors 34, a newest filled sector 36, and a currently filling sector 38. In the illustrated embodiment, the first location to have been written upon an update of RAM 20 is the first location within oldest filled sector 30. That is, filled sector 30 is filled with records (address/data pairs corresponding to data stored in RAM 20) and was the sector that was first filled. In one embodiment, a filled sector, such as filled sectors 30, 32, 34, and 36, includes no empty locations. The next sectors, in time, to have been filled after oldest filled sector 30 are older filled sectors 32. Each sector in older filled sectors 32 was filled in sequentially, where each location in each sector of older filled sectors 32 was filled in sequentially. The next sectors, in time, to have been filled after older filled sectors 32 are newer filled sectors 34. Again, each sector in newer filled sectors 34 was filled in sequentially, where each location in each sector of newer filled sectors 34 was filled in sequentially. Also, note that after the oldest filled sector of older filled sectors 32, the sequential filling wrapped around to the top of flash array 26 to the first sector of newer filled sectors 34. Therefore, note that two record locations in flash array 26 (i.e. a pair of NVM locations) may be considered adjacent (i.e. logically adjacent or logically sequential), even if the second of the two locations requires a wrap around either to the next line, next sector, or even the top of flash array 26. The next sector, in time, to have been filled after newer filled sectors 34 is newest filled sector 36. Again, each location in newest filled sector 36 was filled in sequentially. Therefore, newest filled sector 36 stores more recent data from RAM 20 than newer filled sectors 34 which store more recent data from RAM 20 than older filled sectors 32 which store more recent data from RAM 20 than oldest filled sector 30.

Still referring to FIG. 2, the next sector, in time, to be filled after newest filled sector 36 is currently filling sector 38. Therefore, FIG. 2 represents flash array 26 at a particular point in time during operation of memory system 18 during which sector 38 is currently being filled. FIG. 2 illustrates a blown up version of this sector to better understand how flash array 26 gets sequentially filled (i.e. written to or loaded). This is also the process of updating the EEE memory system 18. Note that currently filling sector 38 began filling at its first location after the last location of newest filled sector 36 was filled. Currently filling sector 38 is illustrated as having a plurality of lines, where each of the first four lines represents a filled line 46 (in which all locations within the line are filled and thus no locations within that line are empty). Each of the last 8 lines of currently filling sector 38 represents an empty line 50 (in which all locations within the line are empty, being logic level ones, and thus no locations within the line are filled). Currently filling sector 38 is currently being filled at line 48, which includes both filled locations and empty locations, separated by a boundary 43. Note that location 42 represents the location storing the most recently written record where ADDR2 represents the address location in RAM 20 that was most recently updated with a new value and DATA2 represents the updated value written to that address location in RAM 20. Location 44, which is adjacent location 42, represents the next available, sequentially addressable, location where the next update to RAM 20 would be recorded. Note that the location sequentially preceding location 42 stores ADDR1 which represents the next most recently updated address location in RAM 20, updated prior to ADDR2, and DATA1 represents the updated value that was written to ADDR1 in RAM 20. Note that, in one embodiment, since updates of ADDR1 and ADDR2 were stored in flash array 26, it is assumed that DATA1 and DATA2 were different values from those stored at ADDR1 and ADDR2, respectively, prior to the updates. Also, note that each sector of flash array 26 can have any number of lines, and the illustration of currently filling sector 38 simply provides one example of the sectors each including 13 lines. Therefore, it can be understood how the loading of flash array 26 is performed sequentially according to sequential addresses. Furthermore, during operation of EEE memory system 18, flash array 26 may include a pair of locations that includes an oldest filled location (e.g. location 42) and an empty location sequential to the last filled location (e.g. location 44).

In the past, at some point when a currently filling sector such as currently filling sector 38 becomes filled and there eventually becomes a need for additional empty space for subsequent updates, the oldest filled sector such as oldest filled sector 30 has its active records transferred to an empty sector and then the oldest filled sector is erased. This combined operation of transferring data and erasing can be quite time consuming and very undesirable.

Figure 3:
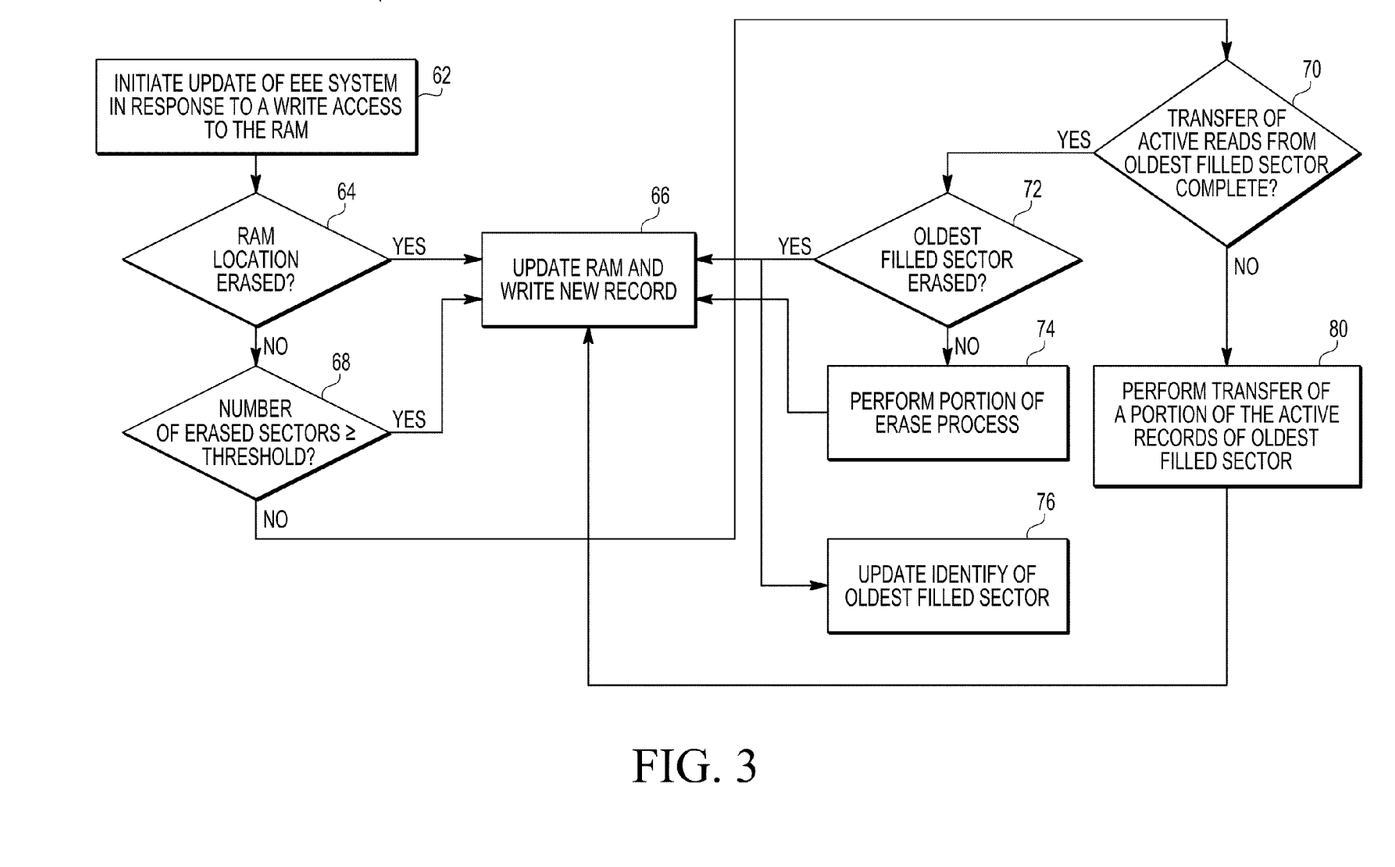
FIG. 3 illustrates a flow diagram of a method according to the embodiment.

Shown in FIG. 3 is a flow chart 60 that describes a method of operating EEE memory system 18 that avoids the situation of the delay of transferring all of the active records and performing the complete erase process for the sector in a continuous process. An update is initiated at a step 62 of EEE memory system 18. Step 62 begins in response to a write access to RAM 20 to perform a write on a selected location. A determination is made in step 64 as to whether the location in RAM 20 that is to be written is already in the erased condition. In an NVM, if the location to be written is already erased, then the only task is to perform the write. Thus, as an emulation of an NVM, the selected location is simply written in the next location in the currently filling selector which in the example of FIG. 2 would be sector 38 and more particularly would fill location 44.

Figure 4:
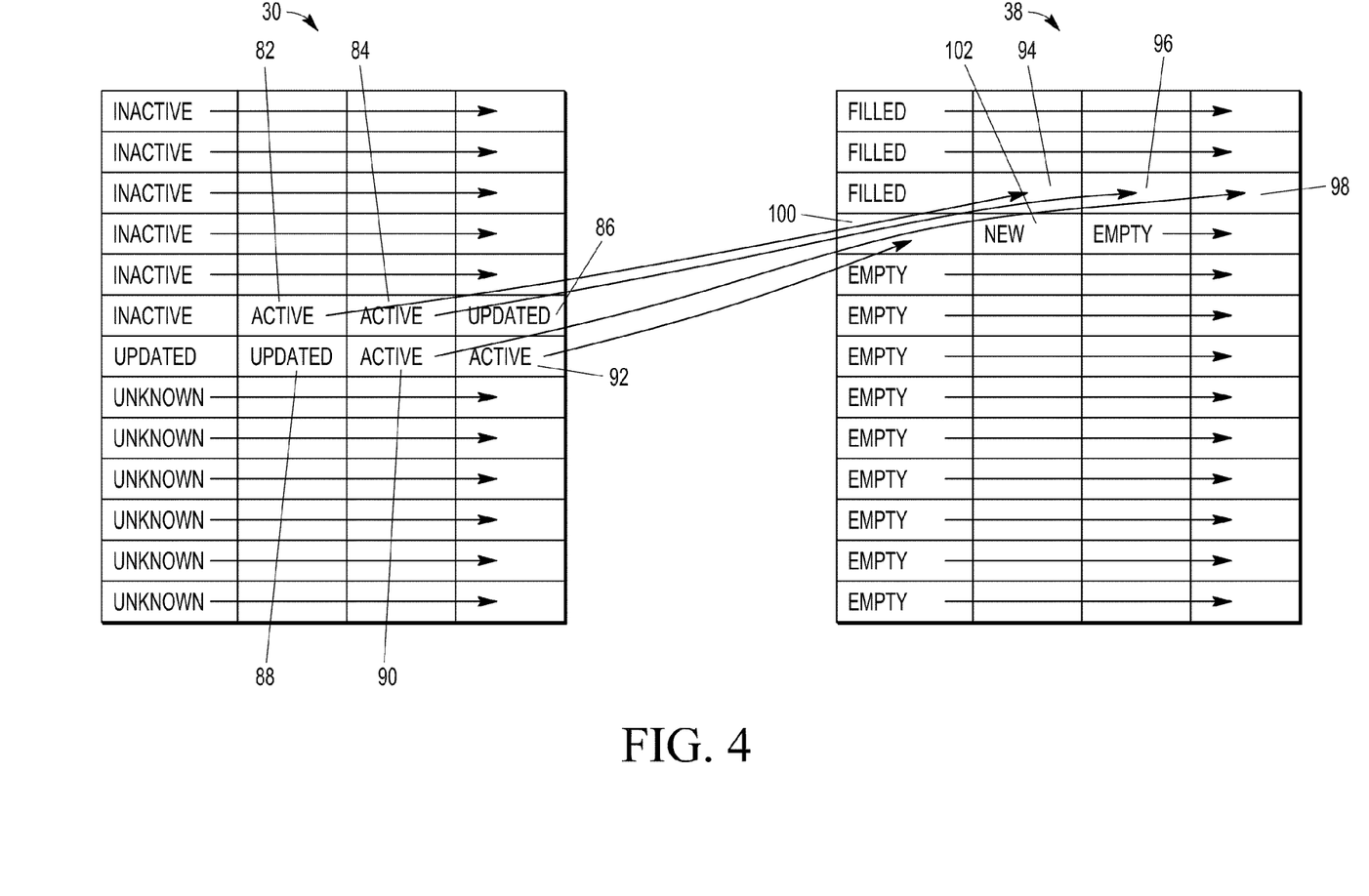
FIG. 4 illustrates two sectors of the non-volatile memory useful in understanding the method of FIG. 3.

Shown in FIG. 4 is a diagram of oldest filled sector 30 and currently filling sector 38 in an example useful in understanding the steps, especially step 80, of flow chart 60 for the case where the RAM location to be written is not in the erased condition. Oldest filled sector 30 has a first portion of the records in the inactive condition. Inactive in this case means that the record has either been updated and thus more recent data written in a subsequent location in NVM 26 or has been transferred to a different location in NVM 26. Thus, a location that was most recently written into for a given location in RAM has an active record. After the first portion of inactive locations, which ends in this example with an inactive location at the beginning of a row, there is an active record 82 at the second location in the row, followed by an active record 84, followed by an updated record 86 at the end of the row, followed by an updated record 88 at the beginning of the next row, followed by an active record 90, and followed by an active record 92. Currently filled sector 38 begins with filled locations followed by empty locations. The first five locations after the filled locations are to filled during the write operation. In this example, the last filled location is the first location in a row, the next location is location 94, followed by location 96, followed by location 98, a location 100 begins the next row, and followed by a location 102. The remaining locations are empty.

For the case in the method of step 64 identifying the RAM location as not being in the erased condition, the next step is determining if the number of erased sectors is greater than or equal to a threshold. This may simply be that there at least one completely empty sector or there may be a higher requirement such as two or three. If the threshold is met then the update can be performed simply as a write of the next location such as location 44 shown in FIG. 3. On the other hand, if the threshold is not met, which would occur for the case shown in FIG. 2 if the requirement was that there be two empty sectors, the next step, step 70, is to determine if the transfer of active records from the oldest filled sector has been completed. If all of the records are inactive then the transfer has been completed and the next step is at 72. If any of records are still active, then the next step is to perform a transfer of a portion of the active records from the oldest filled sector. In this described example, the portion to be transferred from the oldest filled sector is four records and is shown in FIG. 4. As shown in FIG. 4, active record 82 is transferred to location 94, active record 84 is transferred to location 96, active record 90 is transferred to location 98, and active record 92 is transferred to location 100. Upon the transfer of records 82, 84, 90, and 92, they are marked inactive. Records 86 and 88 are already inactive as a result of having been updated. Thus, records 86 and 88 are skipped and not transferred as part of the write operation. The new data for the selected location in RAM 20 that is to be written is written into location 102 as shown in FIG. 4 and as step 66 in FIG. 3.

If, on the other hand, the determination in step 70 is that all of the records in the oldest filled sector are inactive, then a step 72 of determining if the oldest filled sector has been erased is performed. If yes, then the EEE memory system 18 is updated by writing into the next location in the currently filling sector such as location 44 as shown in FIG. 2. Also that means that there is now a different oldest filled sector. Accordingly, in step 76, the new oldest filled sector is identified. If the oldest filled sector has not been erased, then a portion of the erase process is performed. In this example, the erase process includes applying a number of write pulses to the oldest filled sector. A portion can thus be a single erase pulse being applied. The erase process may include a hundred pulses so each pulse is only a hundredth of the total erase so that each occurrence of the erase pulse is relatively short having a relatively small effect on the entire write cycle. Variations on this include varying the pulse width or the number of pulses. The variation could be based on how near full the sector being filled is. For example, two pulses could be generated or the width of the pulse could be doubled. The portion of the write process performed is less than the complete write process. The EEE memory system 18 is updated by writing into the next location in the currently filling sector such as location 44 as shown in FIG. 2. It may desirable to perform the write, step 66, and the portion of the erase process, step 74, at the same time.

By now it should be appreciated that there has been provided a method that allows for doing a portion of the data transfer or a portion of the write process for each update cycle as needed to ensure that there is sufficient space available to perform updates without having to do a large data transfer and complete erase process at all at once causing a large delay when that occurs.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Also for example, in one embodiment, the illustrated elements of system 10 are circuitry located on a single integrated circuit or within a same device. Alternatively, system 10 may include any number of separate integrated circuits or separate devices interconnected with each other. For example, EEE memory system 18 may be located on a same integrated circuit as processor 14 or on a separate integrated circuit. Memory system 18 may be an embedded memory system or a stand alone memory system. Other module(s) 16 may also be located on separate integrated circuits or devices.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any type of NVM may be used rather than a flash memory. Also step 80 is described as transferring four records followed by writing new data into the currently filling sector but the order of the four records and the new data could be different than that. While the number of transferred records is less than the total number of records in a sector, the number can certainly be a predetermined different than four. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

There is disclosed a method of operating an emulated electrically erasable memory system having a random access memory (RAM) and a non-volatile memory (NVM), the NVM having a plurality of sectors, one of which is a currently filling sector and another of which is an oldest filled sector, wherein locations of the currently filling sector are loaded according to a logically sequential ordering. The method includes receiving a write access to the RAM, wherein the write access provides first write data and a first address of the RAM. The method further includes in response to the write access, storing the first write data to the first address of the RAM. The method further includes in response to the write access, updating an empty location of the currently filling sector of the NVM that is logically sequential and immediately adjacent to a most recently filled location of the currently filling sector, wherein updating the empty location comprises storing the first write data and the first address as a first record in the empty location. The method further includes in response to the write access, based on whether there are any remaining active records in the oldest filled sector, performing one of a transfer of up to a predetermined number of active records from the oldest filled sector to the currently filling sector of the NVM, wherein the predetermined number of active records is less than a maximum number of total records that may be stored within the oldest filled sector, and wherein each active record includes a RAM address and corresponding data which represents data stored in the RAM at the RAM address, or a portion of an erase process by providing a predetermined number of erase pulses to the oldest filled sector of the NVM, wherein the predetermined number of erase pulses is less than a total number of erase pulses needed to complete the erase process. The method may have a further characterization by which the step of performing one of the transfer of up to the predetermined number of active records or the portion of the erase process in response to the write access comprises determining whether there are any remaining active records in the oldest filled sector; if there are any remaining active records in the oldest filled sector, performing the transfer of up to the predetermined number of active records from the oldest filled sector to the currently filling sector of the NVM; and if there are not any remaining active records in the oldest filled sector, performing the portion of the erase process by providing the predetermined number of erase pulses to the oldest filled sector of the NVM. The method may have a further characterization by which, if there are not any remaining active records in the oldest filled sector, the method further comprises determining if the oldest filled sector of the NVM has been fully erased, wherein the portion of the erase process is performed only if the oldest filled sector of the NVM has not been fully erased. The method may further include if the oldest filled sector of the NVM has been fully erased, updating an identity of the oldest filled sector from oldest filled sector to erased sector. The method may have a further characterization by which if there any remaining active records in the oldest filled sector, the performing the transfer of up to the predetermined number of active records comprises storing each transferred active record at a subsequent empty location of the currently filling sector of the NVM, wherein each subsequent empty location is logically sequential and immediately adjacent to the most recently filled location of the currently filling sector. The method may further include in response to the write access, determining whether a location of the RAM indicated by the first address of the RAM is empty; and performing the one of the transfer of up to the predetermined number of active records or the portion of the erase process only if the location of the RAM indicated by the first address of the RAM is determined to not be empty. The method may further include in response to the write access, determining whether a number of erased sectors of the NVM is greater than a predetermined threshold; and performing the one of the transfer of up to the predetermined number of active records or the portion of the erase process only if the number of erased sectors is less than the predetermined threshold. The method may have a further characterization by which the one of the transfer of up to the predetermined number of active records or the portion of the erase process is performed only if a location of the RAM indicated by the first address of the RAM is determined to not be empty and the number of erased sectors is less than the predetermined threshold. The method may have a further characterization by which the predetermined number of erase pulses is one.

Disclosed also is a method of operating an emulated electrically erasable memory system having a random access memory (RAM) and a non-volatile memory (NVM), the NVM having a plurality of sectors, one of which is a currently filling sector and another of which is an oldest filled sector, wherein locations of the currently filling sector are updated according to a logically sequential ordering. The method includes receiving a first write access to the RAM, wherein the first write access provides first write data and a first address of the RAM. The method further includes in response to the first write access, storing the first write data to the first address of the RAM. The method further includes in response to the first write access, updating an empty location of the currently filling sector of the NVM that is logically sequential and immediately adjacent to a most recently filled location of the currently filling sector, wherein updating the empty location comprises storing the first write data and the first address as a first record in the empty location. The method further includes in response to the first write access, determining that there are remaining active records in the oldest filled sector of the NVM and transferring up to a predetermined number of active records from the oldest filled sector to the currently filling sector of the NVM, wherein the predetermined number of active records is less than a maximum number of total records that may be stored within the oldest filled sector, and wherein each active record includes a RAM address and corresponding data which represents data currently stored in the RAM at the RAM address. The method may have a further characterization by which the transferring up to the predetermined number of active records comprises storing each transferred active record at a subsequent empty location of the currently filling sector of the NVM, wherein each subsequent empty location is logically sequential and immediately adjacent to the most recently filled location of the currently filling sector. The method may have a further characterization by which the transferring up to the predetermined number of active records is done further in response to determining that a location of the RAM indicated by the first address of the RAM is not empty. The method may further include receiving a second write access to the RAM, wherein the second write access provides second write data and a second address of the RAM, in response to the second write access, storing the second write data to the second address of the RAM, in response to the second write access, updating a second empty location of the currently filling sector of the NVM that is logically sequential and immediately adjacent to the most recently filled location of the currently filling sector, wherein updating the second empty location comprises storing the second write data and the second address as a second record in the second empty location, and in response to the second write access, determining that there are not any remaining active records in the oldest filled sector of the NVM and providing up to a predetermined number of erase pulses to the oldest filled sector of the NVM, wherein the predetermined number of erase pulses is less than a total number of erase pulses needed to completely erase the oldest filled sector of the NVM. The method may further comprise in response to the second write access, determining if the oldest filled sector of the NVM has been fully erased, wherein the predetermined number of erase pulses is provided to the oldest filled sector of the NVM only if the oldest filled sector of the NVM has not been fully erased. The method may further comprise if the oldest filled sector of the NVM has been fully erased, updating an identity of the oldest filled sector from oldest filled sector to erased sector. The method may further comprise receiving a second write access to the RAM, wherein the second write access provides second write data and a second address of the RAM, in response to the second write access, storing the second write data to the second address of the RAM, in response to the second write access, updating a second empty location of the currently filling sector of the NVM that is logically sequential and immediately adjacent to the most recently filled location of the currently filling sector, wherein updating the second empty location comprises storing the second write data and the second address as a second record in the second empty location, and in response to the second write access, determining whether there are any remaining active records in the oldest filled sector of the NVM, and, if there are any remaining active records, transferring an additional number of active records, up to the predetermined number of active records, from the oldest filled sector to the currently filling sector of the NVM.

Also disclosed is a method of operating an emulated electrically erasable memory system having a random access memory (RAM) and a non-volatile memory (NVM), the NVM having a plurality of sectors, one of which is a currently filling sector and another of which is an oldest filled sector, wherein locations of the currently filling sector are updated according to a logically sequential ordering. The method includes receiving a first write access to the RAM, wherein the first write access provides first write data and a first address of the RAM. The method further includes in response to the first write access, storing the first write data to the first address of the RAM. The method further includes in response to the first write access, updating an empty location of the currently filling sector of the NVM that is logically sequential and immediately adjacent to a most recently filled location of the currently filling sector, wherein updating the empty location comprises storing the first write data and the first address as a first record in the empty location. The method further includes in response to the first write access, determining that there are no remaining active records in the oldest filled sector of the NVM and providing up to a predetermined number of erase pulses to the oldest filled sector of the NVM, wherein the predetermined number of erase pulses is less than a total number of erase pulses needed to completely erase the oldest filled sector of the NVM. The method may further include receiving a second write access to the RAM, wherein the second write access provides second write data and a second address of the RAM, and wherein the second write access is an immediately successive write access to the first write access; in response to the second write access, storing the second write data to the second address of the RAM; in response to the second write access, updating a second empty location of the currently filling sector of the NVM that is logically sequential and immediately adjacent to the most recently filled location of the currently filling sector, wherein updating the second empty location comprises storing the second write data and the second address as a second record in the second empty location; and in response to the second write access, determining whether the oldest filled sector of the NVM has been completely erased and, if the oldest filled sector has not been completely erased, providing one or more additional erase pulses to the oldest filled sector, up to the predetermined number of erase pulses, wherein the oldest filled sector of the NVM during the first write access is a same sector of the NVM as the oldest filled sector of the NVM during the second write access. The method may further comprise in response to the second write access, if the oldest filled sector has been completely erased, updating an identity of the oldest filled sector from oldest filled sector to erased sector. The method may have a further characterization by which the predetermined number of erase pulses is one.

What is claimed is:

1. A method of operating an emulated electrically erasable memory system having a random access memory (RAM) and a non-volatile memory (NVM), the NVM having a plurality of sectors, one of which is a currently filling sector and another of which is an oldest filled sector, wherein locations of the currently filling sector are loaded according to a logically sequential ordering, the method comprising:
   receiving a write access to the RAM, wherein the write access provides first write data and a first address of the RAM;
   in response to the write access, storing the first write data to the first address of the RAM;
   in response to the write access, updating an empty location of the currently filling sector of the NVM that is logically sequential and immediately adjacent to a most recently filled location of the currently filling sector, wherein updating the empty location comprises storing the first write data and the first address as a first record in the empty location; and
   determining whether there are any remaining active records in the oldest filled sector;
   in response to the write access,
      if there are any remaining active records in the oldest filled sector, transferring up to a predetermined number of active records from the oldest filled sector to the currently filling sector of the NVM, wherein the predetermined number of active records is less than a maximum number of total records that may be stored within the oldest filled sector, and wherein each active record includes a RAM address and corresponding data which represents data stored in the RAM at the RAM address, or
      if there are not any remaining records in the oldest filled sector, performing a portion of an erase process by providing a predetermined number of erase pulses to the oldest filled sector of the NVM, wherein the predetermined number of erase pulses is less than a total number of erase pulses needed to complete the erase process.

2. The method of claim 1, wherein, if there are not any remaining active records in the oldest filled sector, the method further comprises:
   determining if the oldest filled sector of the NVM has been fully erased, wherein the portion of the erase process is performed only if the oldest filled sector of the NVM has not been fully erased.

3. The method of claim 2, further comprising:
   if the oldest filled sector of the NVM has been fully erased, updating an identity of the oldest filled sector from oldest filled sector to erased sector.

4. The method of claim 1, wherein, if there any remaining active records in the oldest filled sector, the transferring of up to the predetermined number of active records comprises:
   storing each transferred active record at a subsequent empty location of the currently filling sector of the NVM, wherein each subsequent empty location is logically sequential and immediately adjacent to the most recently filled location of the currently filling sector.

5. The method of claim 1, further comprising:
   in response to the write access, determining whether a location of the RAM indicated by the first address of the RAM is empty; and
   performing the transferring of up to the predetermined number of active records or the portion of the erase process only if the location of the RAM indicated by the first address of the RAM is determined to not be empty.

6. The method of claim 1, further comprising:
   in response to the write access, determining whether a number of erased sectors of the NVM is greater than a predetermined threshold; and
   performing the transferring of up to the predetermined number of active records or the portion of the erase process only if the number of erased sectors is less than the predetermined threshold.

7. The method of claim 1, wherein the transferring of up to the predetermined number of active records or the portion of the erase process is performed only if a location of the RAM indicated by the first address of the RAM is determined to not be empty and the number of erased sectors is less than the predetermined threshold.

8. The method of claim 1, wherein the predetermined number of erase pulses is one.

9. A method of operating an emulated electrically erasable memory system having a random access memory (RAM) and a non-volatile memory (NVM), the NVM having a plurality of sectors, one of which is a currently filling sector and another of which is an oldest filled sector, wherein locations of the currently filling sector are updated according to a logically sequential ordering, the method comprising:
   receiving a first write access to the RAM, wherein the first write access provides first write data and a first address of the RAM;
   in response to the first write access, storing the first write data to the first address of the RAM;
   in response to the first write access, updating an empty location of the currently filling sector of the NVM that is logically sequential and immediately adjacent to a most recently filled location of the currently filling sector, wherein updating the empty location comprises storing the first write data and the first address as a first record in the empty location;
   in response to the first write access, determining that there are remaining active records in the oldest filled sector of the NVM and transferring up to a predetermined number of active records from the oldest filled sector to the currently filling sector of the NVM, wherein the predetermined number of active records is less than a maximum number of total records that may be stored within the oldest filled sector, and wherein each active record includes a RAM address and corresponding data which represents data currently stored in the RAM at the RAM address.

10. The method of claim 9, wherein the transferring up to the predetermined number of active records comprises:
storing each transferred active record at a subsequent empty location of the currently filling sector of the NVM, wherein each subsequent empty location is logically sequential and immediately adjacent to the most recently filled location of the currently filling sector.

11. The method of claim 9, wherein the transferring up to the predetermined number of active records is done further in response to determining that a location of the RAM indicated by the first address of the RAM is not empty.

12. The method of claim 9, further comprising:
receiving a second write access to the RAM, wherein the second write access provides second write data and a second address of the RAM;
in response to the second write access, storing the second write data to the second address of the RAM;
in response to the second write access, updating a second empty location of the currently filling sector of the NVM that is logically sequential and immediately adjacent to the most recently filled location of the currently filling sector, wherein updating the second empty location comprises storing the second write data and the second address as a second record in the second empty location;
in response to the second write access, determining that there are not any remaining active records in the oldest filled sector of the NVM and providing up to a predetermined number of erase pulses to the oldest filled sector of the NVM, wherein the predetermined number of erase pulses is less than a total number of erase pulses needed to completely erase the oldest filled sector of the NVM.

13. The method of claim 12, further comprising:
in response to the second write access, determining if the oldest filled sector of the NVM has been fully erased, wherein the predetermined number of erase pulses is provided to the oldest filled sector of the NVM only if the oldest filled sector of the NVM has not been fully erased.

14. The method of claim 13, further comprising:
if the oldest filled sector of the NVM has been fully erased, updating an identity of the oldest filled sector from oldest filled sector to erased sector.

15. The method of claim 9, further comprising:
receiving a second write access to the RAM, wherein the second write access provides second write data and a second address of the RAM;
in response to the second write access, storing the second write data to the second address of the RAM;
in response to the second write access, updating a second empty location of the currently filling sector of the NVM that is logically sequential and immediately adjacent to the most recently filled location of the currently filling sector, wherein updating the second empty location comprises storing the second write data and the second address as a second record in the second empty location;
in response to the second write access, determining whether there are any remaining active records in the oldest filled sector of the NVM, and, if there are any remaining active records, transferring an additional number of active records, up to the predetermined number of active records, from the oldest filled sector to the currently filling sector of the NVM.

16. A method of operating an emulated electrically erasable random access memory system having a random access memory (RAM) and a non-volatile memory (NVM), the NVM having a plurality of sectors, one of which is a currently filling sector and another of which is an oldest filled sector, wherein locations of the currently filling sector are updated according to a logically sequential ordering, the method comprising:
receiving a first write access to the RAM, wherein the first write access provides first write data and a first address of the RAM;
in response to the first write access, storing the first write data to the first address of the RAM;
in response to the first write access, updating an empty location of the currently filling sector of the NVM that is logically sequential and immediately adjacent to a most recently filled location of the currently filling sector, wherein updating the empty location comprises storing the first write data and the first address as a first record in the empty location;
in response to the first write access, determining that there are no remaining active records in the oldest filled sector of the NVM and providing up to a predetermined number of erase pulses to the oldest filled sector of the NVM, wherein the predetermined number of erase pulses is less than a total number of erase pulses needed to completely erase the oldest filled sector of the NVM;
receiving a second write access to the RAM, wherein the second write access provides second write data and a second address of the RAM, and wherein the second write access is an immediately successive write access to the first write access;
in response to the second write access, storing the second write data to the second address of the RAM;
in response to the second write access, updating a second empty location of the currently filling sector of the NVM that is logically sequential and immediately adjacent to the most recently filled location of the currently filling sector, wherein updating the second empty location comprises storing the second write data and the second address as a second record in the second empty location; and
in response to the second write access, determining whether the oldest filled sector of the NVM has been completely erased and, if the oldest filled sector has not been completely erased, providing one or more additional erase pulses to the oldest filled sector, up to the predetermined number of erase pulses, wherein the oldest filled sector of the NVM during the first write access is a same sector of the NVM as the oldest filled sector of the NVM during the second write access.

17. The method of claim 16, further comprising:
in response to the second write access, if the oldest filled sector has been completely erased, updating an identity of the oldest filled sector from oldest filled sector to erased sector.

18. The method of claim 16, wherein the predetermined number of erase pulses is one.

* * * * *